(12) United States Patent
Nishimura et al.

(10) Patent No.: US 10,532,505 B2
(45) Date of Patent: Jan. 14, 2020

(54) INJECTION MOLDING MACHINE

(71) Applicant: FANUC CORPORATION, Yamanashi (JP)

(72) Inventors: Koichi Nishimura, Yamanashi-ken (JP); Toshiaki Ichihara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/035,939

(22) Filed: Jul. 16, 2018

(65) Prior Publication Data

US 2019/0022909 A1    Jan. 24, 2019

(30) Foreign Application Priority Data

Jul. 20, 2017 (JP) ................................ 2017-140815

(51) Int. Cl.
   *B29C 45/17* (2006.01)
   *B29C 45/66* (2006.01)
   (Continued)

(52) U.S. Cl.
   CPC ........ *B29C 45/661* (2013.01); *B29C 45/1756* (2013.01); *B29C 45/7653* (2013.01);
   (Continued)

(58) Field of Classification Search
   CPC .......... B29C 2045/665; B29C 45/7653; B29C 2945/76926; B29C 45/661; F16H 25/20
   (Continued)

(56) References Cited

U.S. PATENT DOCUMENTS

| 4,938,682 A | * | 7/1990 | Kadoriku | ............. B29C 45/661 |
| | | | | 425/451.6 |
| 6,386,853 B1 | * | 5/2002 | Mizuno | ............... B29C 45/5008 |
| | | | | 425/145 |
| 2008/0124419 A1 | * | 5/2008 | Tanaka | ................ B29C 45/1747 |
| | | | | 425/170 |

FOREIGN PATENT DOCUMENTS

| CN | 104070651 A | * | 10/2014 | ............. B29C 45/66 |
| CN | 104070651 A | | 10/2014 | |

(Continued)

OTHER PUBLICATIONS

Notification of Reasons for Refusal issued by the Japanese Patent Office in relation to Japanese Application No. 2017-140815 dated Jan. 15, 2019 (3 pages) along with English language translation (3 pages).

(Continued)

*Primary Examiner* — Jacob T Minskey
*Assistant Examiner* — Cedrick S Williams
(74) *Attorney, Agent, or Firm* — Robert P. Michal, Esq.; Carter, DeLuca & Farrell LLP

(57) ABSTRACT

An injection molding machine capable of opening/closing a movable mold relative to a stationary mold by moving a crosshead backward and forward to move a movable platen backward and forward relative to a stationary platen through a toggle link. The injection molding machine includes a reciprocating mechanism that receives a counterforce exerted on the crosshead in the back-and-forth direction when the movable mold and the stationary mold are closed, and a load acquisition unit that acquires a load exerted on the reciprocating mechanism in a direction perpendicular to the back-and-forth direction of the crosshead.

11 Claims, 12 Drawing Sheets

(51) Int. Cl.
 *B29C 45/76* (2006.01)
 *B29C 45/26* (2006.01)
(52) U.S. Cl.
 CPC .. *B29C 45/1744* (2013.01); *B29C 2045/1785* (2013.01); *B29C 2045/2604* (2013.01); *B29C 2045/665* (2013.01)
(58) Field of Classification Search
 USPC .............................................. 425/145
 See application file for complete search history.

(56) References Cited

FOREIGN PATENT DOCUMENTS

| DE | 102012005268 A1 | 10/2012 | | |
|----|----|----|----|----|
| DE | 102014014232 A1 | 4/2015 | | |
| DE | 102015109840 B3 | 7/2016 | | |
| JP | S52115862 A | 9/1977 | | |
| JP | H09254218 A | 9/1997 | | |
| JP | 2001239562 A | 9/2001 | | |
| JP | 2009132087 A | 6/2009 | | |
| JP | 2011-183705 A | 9/2011 | | |
| JP | 2014104689 A | * | 6/2014 | |
| JP | 2014104689 A | 6/2014 | | |
| JP | 2014-162132 A | 9/2014 | | |
| JP | 2015-140012 A | 8/2015 | | |
| WO | 2016059767 A1 | 4/2016 | | |
| WO | WO-2016059767 A1 | * | 4/2016 | ............. B29C 45/66 |

OTHER PUBLICATIONS

Decision to Grant a Patent issued by the Japanese Patent Office in relation to Japanese Application No. 2017-140815 dated Mar. 12, 2019 (3 pages) along with an English language translation (3 pages).

* cited by examiner

INJECTION MOLDING MACHINE

CROSS-REFERENCE TO RELATED APPLICATION

This application is based upon and claims the benefit of priority from Japanese Patent Application No. 2017-140815 filed on Jul. 20, 2017, the contents of which are incorporated herein by reference.

BACKGROUND OF THE INVENTION

Field of the Invention

The present invention relates to an injection molding machine in which a crosshead moves backward and forward to move a movable platen backward and forward through a toggle link.

Description of the Related Art

Japanese Laid-Open Patent Publication No. 09-254218 discloses an injection molding machine for calculating the clamping force of a mold based on a strain amount detected by a stain sensor which is provided at a toggle mechanical portion of the injection molding machine.

SUMMARY OF THE INVENTION

It is possible to estimate from a load exerted on a reciprocating mechanism a time period for which the reciprocating mechanism for moving a crosshead backward and forward is usable (hereafter referred to as a usable period) from the present time to the time at which the reciprocating mechanism becomes unusable (or deteriorated to the extent of replacement) the reciprocating mechanism. Of the load exerted on the reciprocating mechanism, the magnitude of a load acting in a back-and-forth direction of the crosshead can be calculated from the clamping force of the mold, while the magnitude of a load acting in a direction perpendicular to the moving direction of the crosshead cannot be calculated from the clamping force of the mold. For this reason, a problem arises in that the accuracy of estimating the deterioration degree is low even where the usable period of the reciprocating mechanism is estimated based on a calculated clamping force of the mold in accordance with the technology of Japanese Laid-Open Patent Publication No. 09-254218.

The present invention has been made in order to solve the aforementioned problem, and it is an object of the present invention to provide an injection molding machine capable of acquiring a load that is exerted on a reciprocating mechanism in a direction perpendicular to the back-and-forth direction of a crosshead.

In one aspect, the present invention is directed to an injection molding machine which comprises a stationary platen to which a stationary mold is attached, and a movable platen to which a movable mold is attached. The injection molding machine opens and closes the movable mold relative to the stationary mold by moving a crosshead backward and forward to move the movable platen backward and forward relative to the stationary platen through a toggle link. The injection molding machine further comprises a reciprocating mechanism configured to receive a counterforce exerted on the crosshead in a back-and-forth direction when the movable mold and the stationary mold are closed, and a load acquisition unit configured to acquire a load exerted on the reciprocating mechanism in a direction perpendicular to the back-and-forth direction of the crosshead.

According to the present invention, it is possible to acquire the load exerted on the reciprocating mechanism in the direction perpendicular to the back-and-forth direction of the crosshead.

The above and other objects, features, and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

First Embodiment

[Configuration of Injection Molding Machine]

Figure 1:
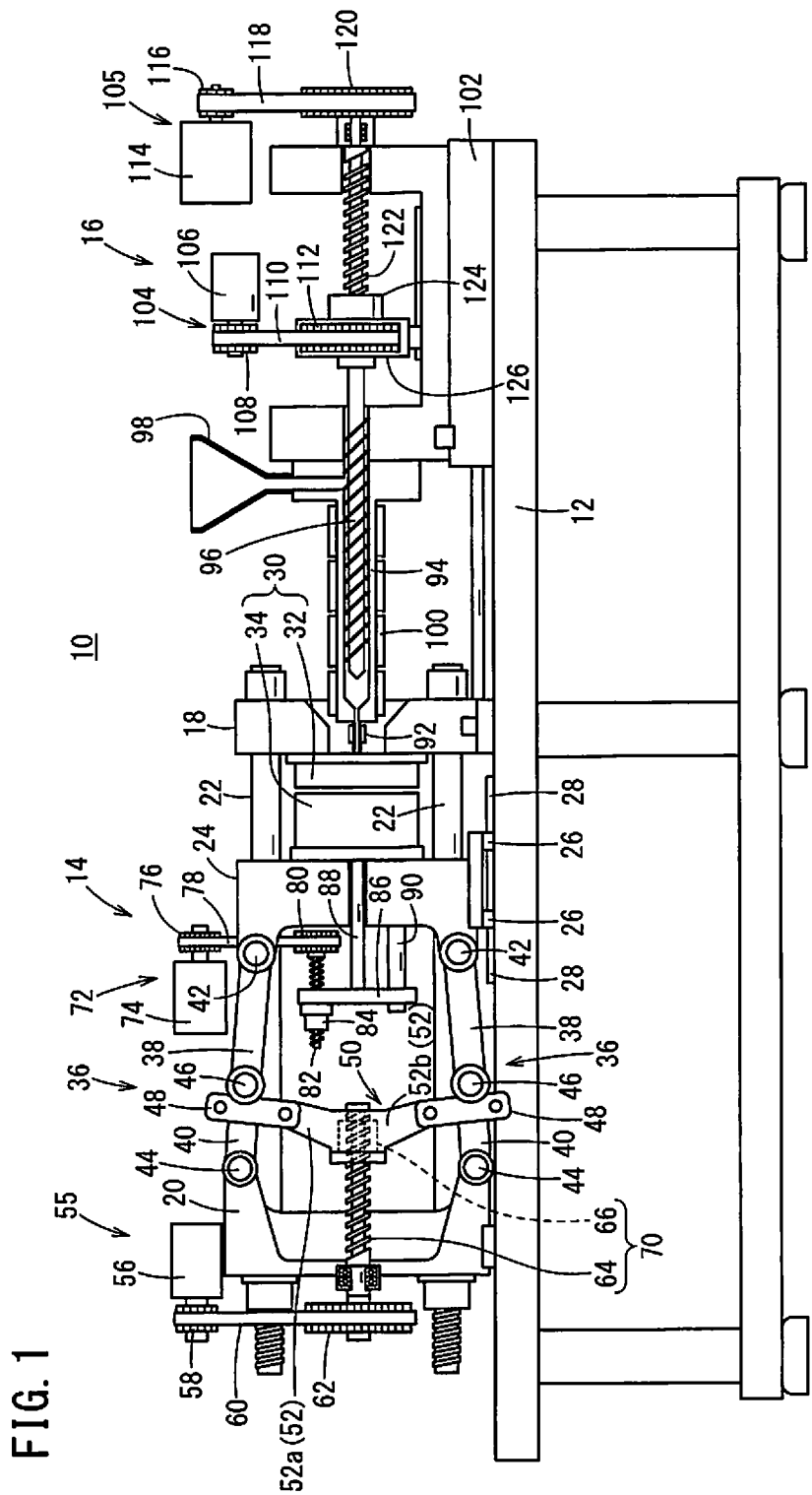
FIG. 1 is a schematic view showing configuration of an injection molding machine in a first embodiment of the present invention.

FIG. 1 is a schematic view showing configuration of an injection molding machine 10. The injection molding machine 10 is equipped with a base 12 and a mold clamping device 14 and an injection device 16 which are installed on the base 12.

The mold clamping device 14 has a stationary platen 18, a rear platen 20 and four tie bars 22. The four tie bars 22 connect the stationary platen 18 to the rear platen 20. The four tie bars 22 are arranged with their axial directions being mutually in parallel. A movable platen 24 is provided between the stationary platen 18 and the rear platen 20. The movable platen 24 is installed on the base 12 through sliding portions 26. The sliding portions 26 are movable along a guide rail 28 provided on the base 12.

Thus, the movable platen 24 is provided to be movable backward and forward relative to the stationary platen 18 in the axial direction of the tie bars 22.

A mold 30 is provided between the stationary platen 18 and the movable platen 24. The mold 30 is composed of a stationary mold 32 and a movable mold 34. The stationary mold 32 is attached to the stationary platen 18 on the movable platen 24 side, while the movable mold 34 is attached to the movable platen 24 on the stationary platen 18 side.

A pair of upper and lower toggle links 36 are provided between the rear platen 20 and the movable platen 24. The toggle links 36 are composed of four links in total including two links on an upper side and two links on a lower side. The toggle links 36 have first link rods 38, second link rods 40, first toggle pins 42, second toggle pins 44 and third toggle pins 46. Respective one ends of the first link rods 38 are pivotably connected to the movable platen 24 through the first toggle pins 42. Respective one ends of the second link rods 40 are pivotably connected to the rear platen 20 through the second toggle pins 44. Respective other ends of the first link rods 38 and respective other ends of the second link rods 40 are mutually pivotably connected through the third toggle pins 46.

Figure 2:
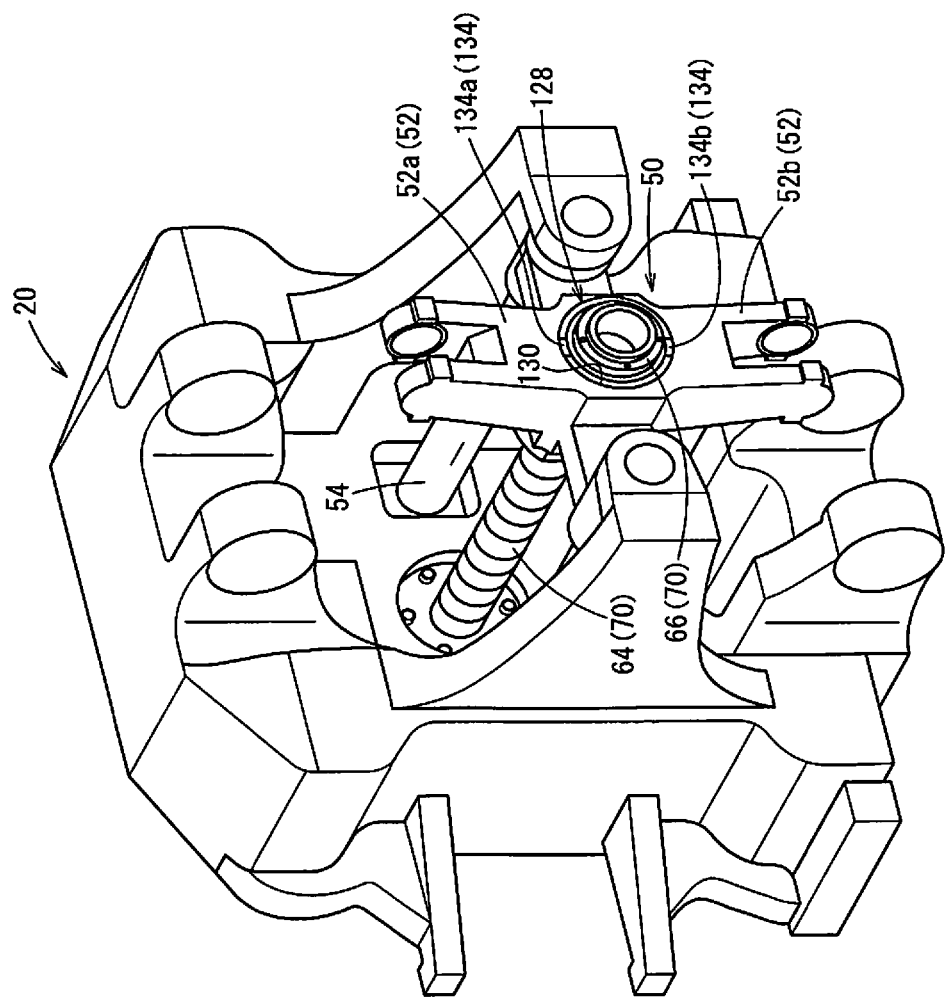
FIG. 2 is a perspective view showing a rear platen and a crosshead.

The second link rods 40 are connected to a crosshead 50 through cross links 48. As best shown in FIG. 2, the crosshead 50 has arms 52 (an upper arm 52a and a lower arm 52b) extending upward and downward respectively and are connected to the cross links 48 at distal end portions of the arms 52. The rear platen 20 is provided with two guide rods 54. The guide rods 54 are provided to make their axial directions parallel to the axial directions of the tie bars 22. The crosshead 50 is guided by the guide rods 54 and is movable backward and forward in the axial direction of the guide rods 54.

Referring back to FIG. 1, the mold clamping device 14 has a mold opening and closing mechanism 55 for opening and closing the mold 30. The mold opening and closing mechanism 55 is equipped with a mold opening and closing motor 56, a drive pulley 58, a belt 60, a driven pulley 62, a ball screw 64 and a ball screw nut 66. The ball screw 64 is provided with its axial direction parallel to the axial direction of the tie bars 22.

The drive pulley 58 is provided to be rotatable integrally with a rotational shaft of the mold opening and closing motor 56, while the driven pulley 62 is provided to be rotatable integrally with the ball screw 64. The belt 60 is wound around the drive pulley 58 and the driven pulley 62 and transmits the rotational force of the drive pulley 58 to the driven pulley 62. The ball screw nut 66 is in screw-engagement with the ball screw 64 and is moved along the ball screw 64 by the rotation of the ball screw 64. The ball screw nut 66 is fixed to the crosshead 50.

When the mold opening and closing motor 56 rotates, the rotational force is transmitted to the ball screw 64 through the drive pulley 58, the belt 60 and the driven pulley 62, so that the ball screw 64 is rotated. The rotation of the ball screw 64 causes the crosshead 50 together with the ball screw nut 66 to move along the guide rods 54. The movement of the crosshead 50 causes the movable platen 24 to move in the axial direction of the tie bars 22 through the cross links 48 and the toggle links 36. Incidentally, the ball screw 64 and the ball screw nut 66 constitute a reciprocating mechanism 70 for moving the crosshead 50 backward and forward.

When the movable platen 24 is moved toward the stationary platen 18 side, the movable mold 34 is brought into abutment on the stationary mold 32 to close the mold 30. On the contrary, when the movable platen 24 is moved toward the rear platen 20 side, the movable mold 34 is separated from the stationary mold 32 to open the mold 30.

The mold clamping device 14 has an ejector mechanism 72 for taking out a molded article from the movable mold 34. The ejector mechanism 72 is equipped with an ejection motor 74, a drive pulley 76, a belt 78, a driven pulley 80, a ball screw 82, a ball screw nut 84, an ejector plate 86, an ejector pin 88, and a guide rod 90. The ball screw 82 and the guide rod 90 are provided to make their axial direction parallel to the axial direction of the tie bars 22.

The drive pulley 76 is rotatable integrally with a rotational shaft of the ejection motor 74, while the driven pulley 80 is rotatable integrally with the ball screw 82. The belt 78 is wound around the drive pulley 76 and the driven pulley 80 and transmits the rotational force of the drive pulley 76 to the driven pulley 80. The ball screw nut 84 is in screw-engagement with ball screw 82, so that the rotation of the ball screw 82 causes the ball screw nut 84 to move along the ball screw 82. The ball screw nut 84 is fixed to the ejector plat 86 provided with ejector pin 88.

When the ejection motor 74 is rotated, the rotational force is transmitted to the ball screw 82 through the drive pulley 76, the belt 78 and the driven pulley 80 to rotate ball screw 82. The rotation of the ball screw 82 causes the ejector plate 86 and the ejector pin 88 together with ball screw nut 84 to move along the guide rod 90. When the ejector pin 88 is moved toward the movable platen 24 side, the molded article is pushed and taken out from the movable mold 34.

The injection device 16 has a nozzle 92, a cylinder 94, a screw 96, a hopper 98, and heater 100. The nozzle 92 is provided at a distal end of the cylinder 94. The cylinder 94 is a hollow member, and the screw 96 is inserted into the cylinder 94. The cylinder 94 and the screw 96 extend in the opening/closing direction of the mold 30. The cylinder 94 is provided with the hopper 98. The hopper 98 is used for introducing a resin material into the cylinder 94. In the case where the resin material introduced from the hopper 98 is in the form of pellets, the resin material in the form of pellets is melted by the heater 100.

The injection device 16 is provided on the base 12 through an extruder base 102. The extruder base 102 is used for enabling the injection device 16 to be moved in the opening and closing direction of the mold 30. The injection device 16 has a screw rotating mechanism 104 for rotating the screw 96 and an injection mechanism 105 for injecting the resin material from the nozzle 92.

The screw rotating mechanism 104 is equipped with a screw rotating motor 106, a drive pulley 108, a belt 110 and a driven pulley 112. The drive pulley 108 is rotatable integrally with a rotational shaft of the screw rotating motor 106, while the driven pulley 112 is rotatable integrally with the screw 96. The belt 110 is wound around the drive pulley 108 and the driven pulley 112 to transmit the rotational force of the drive pulley 108 to the driven pulley 112.

When the screw rotating motor 106 rotates, the rotational force is transmitted to the screw 96 to rotate the screw 96 through the drive pulley 108, the belt 110 and the driven pulley 112. By the rotation of the screw 96, the melted resin material is fed to the nozzle 92 side.

The injection mechanism 105 is equipped with an injection motor 114, a drive pulley 116, a belt 118, driven pulley 120, a ball screw 122, a ball screw nut 124 and a pusher plate 126. The ball screw 122 is provided to make the axial direction aligned with the axial direction of the screw 96.

The drive pulley 116 is rotatable integrally with a rotational shaft of the injection motor 114, while the driven pulley 120 is rotatable integrally with the ball screw 122. The belt 118 is wound around the drive pulley 116 and the driven pulley 120 to transmit the rotational force of the drive pulley 116 to the driven pulley 120. Ball screw nut 124 is in screw-engagement with the ball screw 122 and thus is moved along the ball screw 122 by the rotation of the ball screw 122. The ball screw nut 124 is fixed to the pusher plate 126.

When the injection motor 114 rotates, the rotational force is transmitted to the ball screw 122 through the drive pulley 116, the belt 118 and the driven pulley 120 to rotate the ball screw 122. The rotation of the ball screw 122 causes the pusher plate 126 together with the ball screw nut 124 to move in the axial direction of the ball screw 122. As the pusher plate 126 moves, the screw 96 moves in the cylinder 94 in the axial direction of the ball screw 122. When the screw 96 is moved toward the nozzle 92, the resin material stored on the distal end side of the screw 96 in the cylinder 94 is injected from the nozzle 92.

[Load Acquisition Unit]

Figure 3:
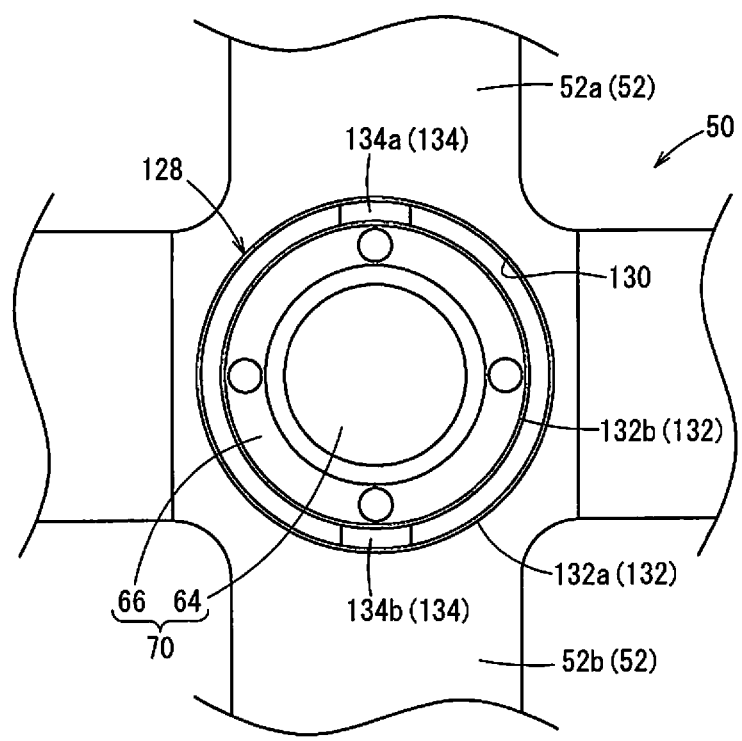
FIG. 3 is a front schematic view partially showing the crosshead as viewed from a movable platen side.

FIG. 2 is a perspective view showing the rear platen 20 and the crosshead 50. FIG. 3 is a front schematic view partially showing the crosshead 50 as viewed from the movable platen 24 side.

A load acquisition unit 128 is provided between the crosshead 50 and the reciprocating mechanism 70. The crosshead 50 is formed with a cylindrical fitting hole 130 around the outer periphery of the ball screw nut 66. The load acquisition unit 128 is fitted in the fitting hole 130.

The load acquisition unit 128 has a case 132 and load cells 134. As best shown in FIG. 3, the case 132 has an outer peripheral cylinder portion 132a and an inner peripheral cylinder portion 132b. The load cells 134 connect the outer peripheral cylinder portion 132a to the inner peripheral cylinder portion 132b. Thus, it is possible to constitute the load acquisition unit 128 integrally.

The load cells 134 are respectively provided on an upper side and a lower side of the reciprocating mechanism 70 with the reciprocating mechanism 70 interposed therebetween (an upper load cell 134a and a lower load cell 134b). The upper load cell 134a detects a load that compresses or stretches the upper arm 52a in the vertical direction, while the lower load cell 134b detects a load that compresses or stretches the lower arm 52b in the vertical direction. A load that is exerted on the reciprocating mechanism 70 from the crosshead 50 in a direction perpendicular to the back-and-forth direction of the crosshead 50 can be calculated from the difference between respective loads detected by the upper load cell 134a and the lower load cell 134b.

[Estimation of Usable Period]

Figure 4:
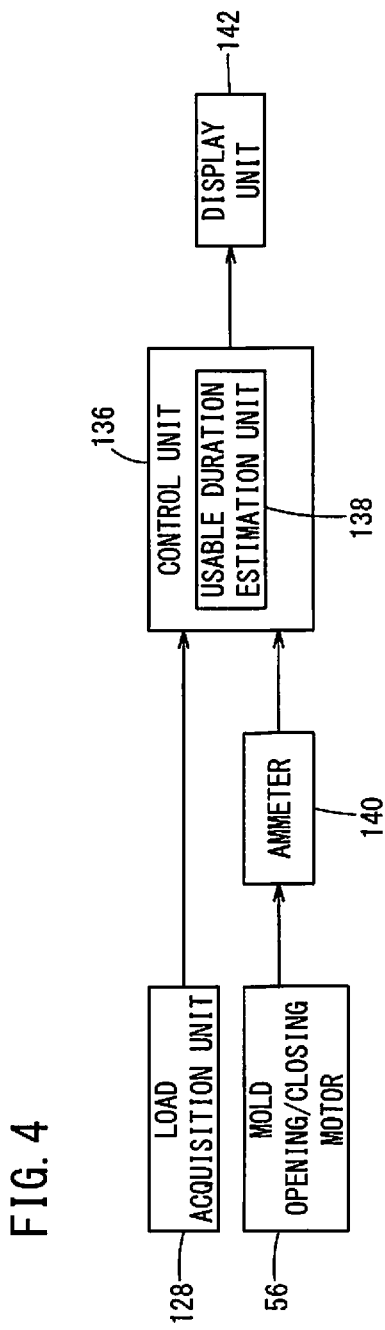
FIG. 4 is a block diagram showing configuration of a control unit.

FIG. 4 is a block diagram showing the configuration of a control unit 136. The control unit 136 has a usable period estimation unit 138. The usable period estimation unit 138 inputs thereto the respective loads detected by the upper load cell 134a and the lower load cell 134b from the load acquisition unit 128 and calculates a load exerted on the reciprocating mechanism 70 in the direction perpendicular to the back-and-forth direction of the crosshead 50 from the difference between the respective loads detected by the upper load cell 134a and the lower load cell 134b. Further, the usable period estimation unit 138 inputs thereto a current value from an ammeter 140 that detects the current value of the mold opening and crossing motor 56, and calculates a load that is exerted on the reciprocating mechanism 70 in the back-and-forth direction of the crosshead 50.

Then, the usable period estimation unit 138 estimates a remaining usable period of the reciprocating mechanism 70 from the load exerted on the reciprocating mechanism 70 in the direction perpendicular to the back-and-forth direction of the crosshead 50 and the load exerted on the reciprocating mechanism 70 in the back-and-forth direction of the crosshead 50. Furthermore, the usable period estimation unit 138 controls a display unit 142 to display an estimated usable period on the display unit 142.

Therefore, it is possible for the operator to grasp the time for replacing the reciprocating mechanism 70, so that it is possible to make a new reciprocating mechanism 70 ready before the reciprocating mechanism 70 in current use becomes no longer usable.

[Operations and Effects]

Figure 5:
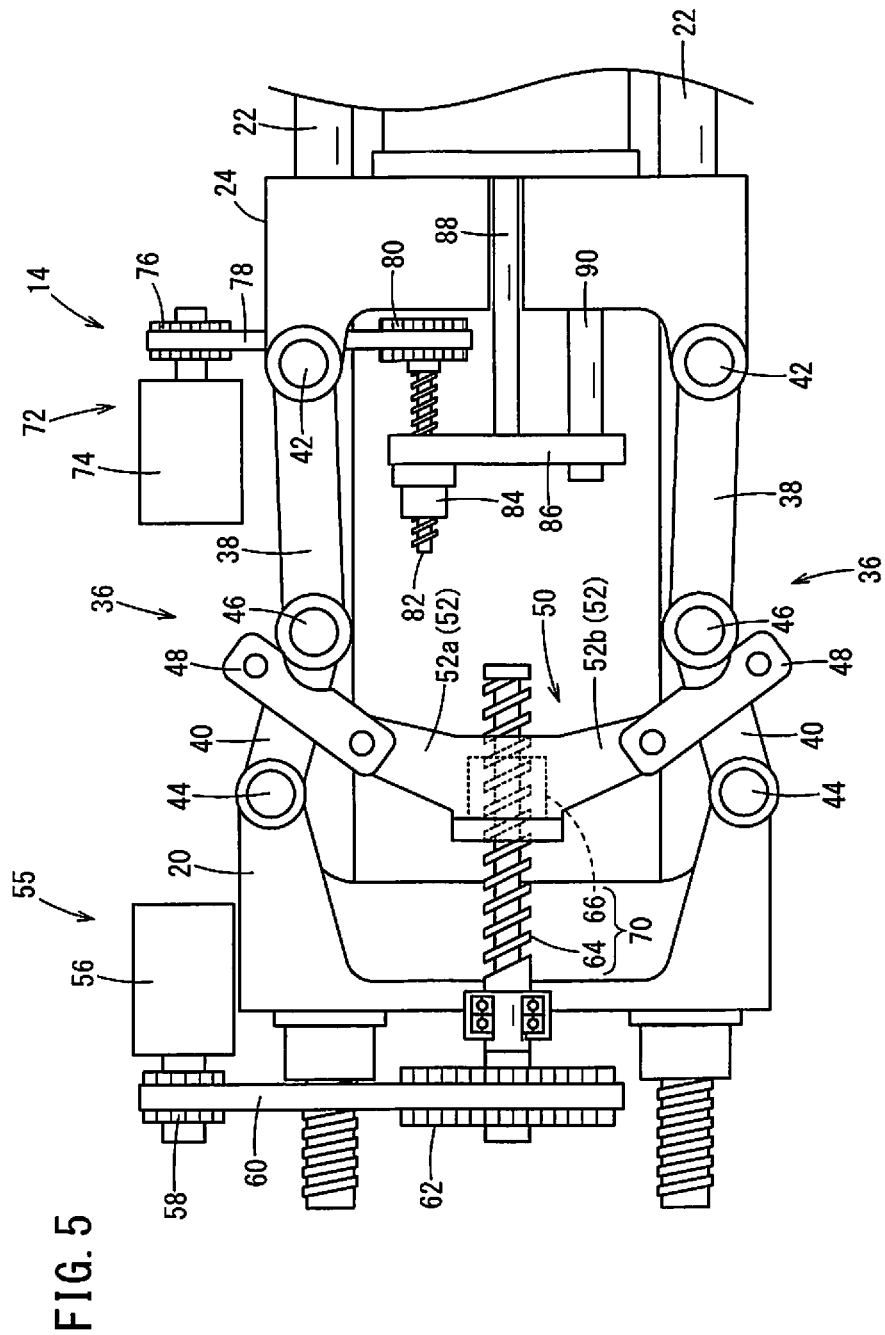
FIG. 5 is a schematic view showing the states of the movable platen, the rear platen, toggle links and the crosshead when a mold is opened.
Figure 6:
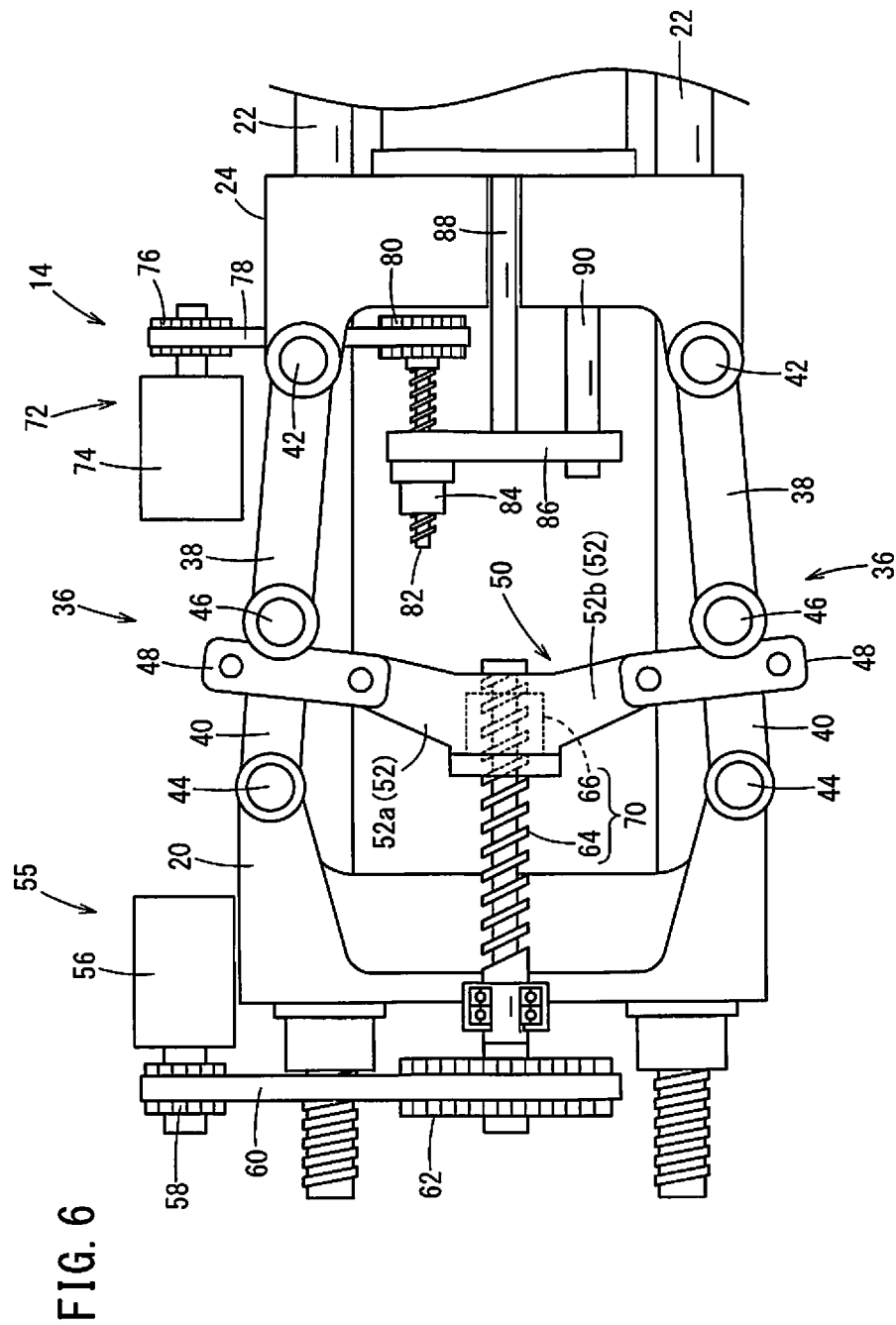
FIG. 6 is a schematic view showing the states of the movable platen, the rear platen, the toggle links and the crosshead when the mold is closed.

FIG. 5 is a schematic view showing the states of the movable platen 24, the rear platen 20, the torque links 36 and the crosshead 50 when the mold 30 is open. FIG. 6 is a schematic view showing the states of the movable platen 24, the rear platen 20, the torque links 36 and the crosshead 50 when the mode 30 is closed.

When the mold 30 is closed, a counterforce that the movable mold 34 receives from the stationary mold 32 is transmitted as a load to the reciprocating mechanism 70 through the movable platen 24, the toggle links 36, the cross links 48 and the crosshead 50.

Because the counterforce that the movable mold 34 receives from the stationary mold 32 acts in a direction to push the movable mold 34 back, the crosshead 50 also receives the counterforce in a direction to be pushed back, so that a load is exerted on the reciprocating mechanism 70 in the back-and-forth direction of the crosshead 50.

The first link rods 38 and the second link rods 40 of the toggle links 36 have little clearance from the first toggle pins 42, the second toggle pins 44 and the third toggle pins 46. Because the gravity acts on the toggle links 36, the upper toggle link 36 and the lower toggle link 36 are each biased downward, and thus, the shape of the upper toggle link 36 and the shape of the lower toggle link 36 do not become a line symmetry relative to the reciprocating mechanism 70. Therefore, a difference occurs between a force applied from the upper toggle link 36 to the crosshead 50 and a force applied from the lower toggle link 36 to the crosshead 50. Consequently, a load in the direction perpendicular to the back-and-forth direction of the crosshead 50 is exerted on the reciprocating mechanism 70.

The load exerted on the reciprocating mechanism 70 in the back-and-forth direction of the crosshead 50 can be calculated from the clamping force of the mold 30. Specifically, the clamping force of the mold 30 can be calculated from a current value of the mold opening and closing motor 56. However, the load exerted on the reciprocating mechanism 70 in the direction perpendicular to the back-and-forth direction of the crosshead 50 cannot be calculated only from the clamping force of the mold 30.

In order to estimate the usable period of the reciprocating mechanism 70, there is required a load exerted on the reciprocating mechanism 70. However, the load exerted on the ball screw 64 in the direction perpendicular to the back-and-forth direction of the crosshead 50 cannot be calculated. Thus, in the prior art, the usable period of the reciprocating mechanism 70 has been estimated from the load in the back-and-forth direction of the crosshead 50, and an ultimate usable period has been calculated by multiplying a safety ratio with the estimated usable period or the like.

The usable period of the reciprocating mechanism 70 calculated in this way involves a problem that the accuracy of the estimation is low because no consideration is taken into the load exerted on the reciprocating mechanism 70 in the direction perpendicular to the back-and-forth direction of the crosshead 50.

In the present embodiment, the load acquisition unit 128 is provided for acquiring the load exerted on the reciprocating mechanism 70 in the direction perpendicular to the back-and-forth direction of the crosshead 50. As a result, it is possible to accurately calculate the load exerted on the reciprocating mechanism 70 in the direction perpendicular to the back-and-forth direction of the crosshead 50.

Further, in the present embodiment, the load acquisition unit 128 is provided between the reciprocating mechanism 70 and the crosshead 50. With this arrangement, it is possible for the load acquisition unit 128 to directly acquire the force transmitted from the crosshead 50 to the reciprocating mechanism 70. Therefore, it is possible to accurately calculate the load exerted on the reciprocating mechanism 70 in the direction perpendicular to the back-and-forth direction of the crosshead 50.

Further, in the present embodiment, the upper load cell 134a and the lower load cell 134b are respectively provided on the upper and lower side with the reciprocating mechanism 70 interposed therebetween. With this arrangement, from a difference between respective loads detected by the upper load cell 134a and the lower load cell 134b, it is possible to accurately calculate the load exerted on the reciprocating mechanism 70 in the direction perpendicular to the back-and-forth direction of the crosshead 50.

Further, in the present embodiment, the load acquisition unit 128 has the outer peripheral cylinder portion 132a and the inner peripheral cylinder portion 132b, and the load cells 134 connect the outer peripheral cylinder portion 132a to the inner peripheral cylinder portion 132b. With this arrangement, it is possible to constitute the load acquisition unit 128 integrally.

Furthermore, in the present embodiment, the usable period estimation unit 138 is configured to estimate the remaining usable period of the reciprocating mechanism 70 from the load exerted on the reciprocating mechanism 70 in the direction perpendicular to the back-and-forth direction of the crosshead 50 and the load exerted on the reciprocating mechanism 70 in the back-and-forth direction of the crosshead 50. With this configuration, it is possible to improve the accuracy in estimating the usable period of the reciprocating mechanism 70.

It is to be noted that in the following second to fourth embodiments of the present invention, the same reference numerals as used in the foregoing first embodiment will be given to components which correspond in function and configuration to those in the first embodiment.

Second Embodiment

Figure 7:
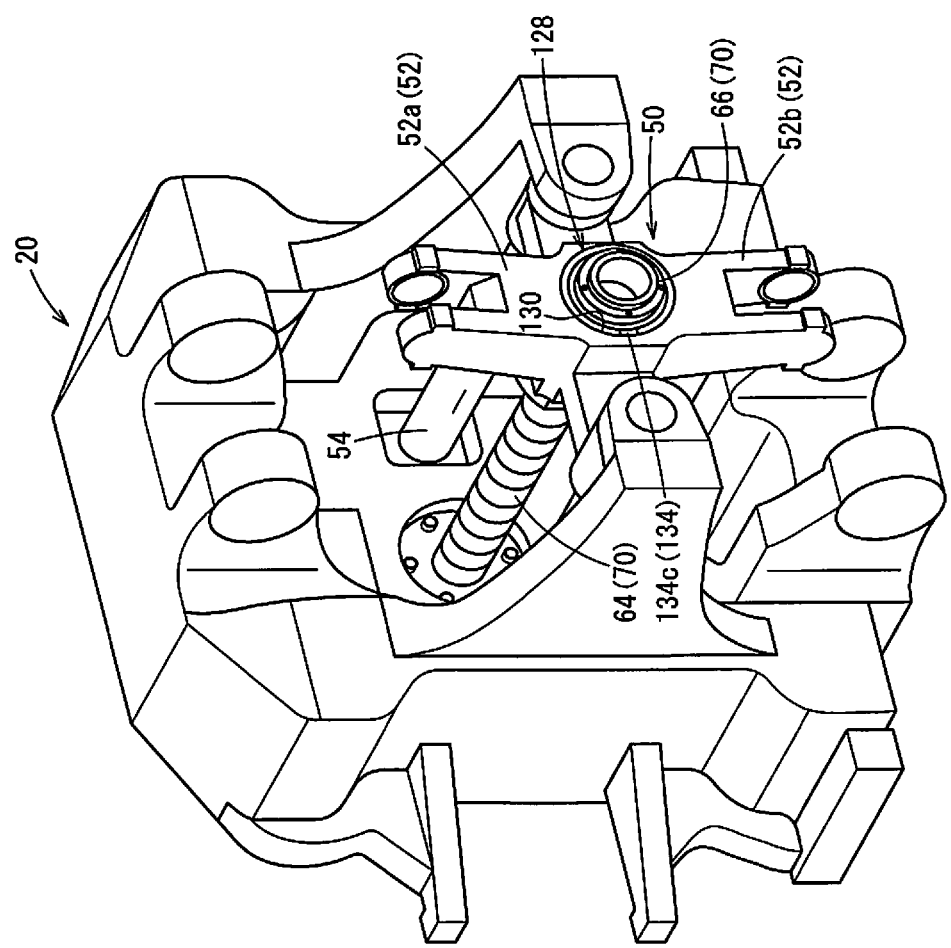
FIG. 7 is a perspective view showing the rear platen and the crosshead in a second embodiment of the present invention.
Figure 8:
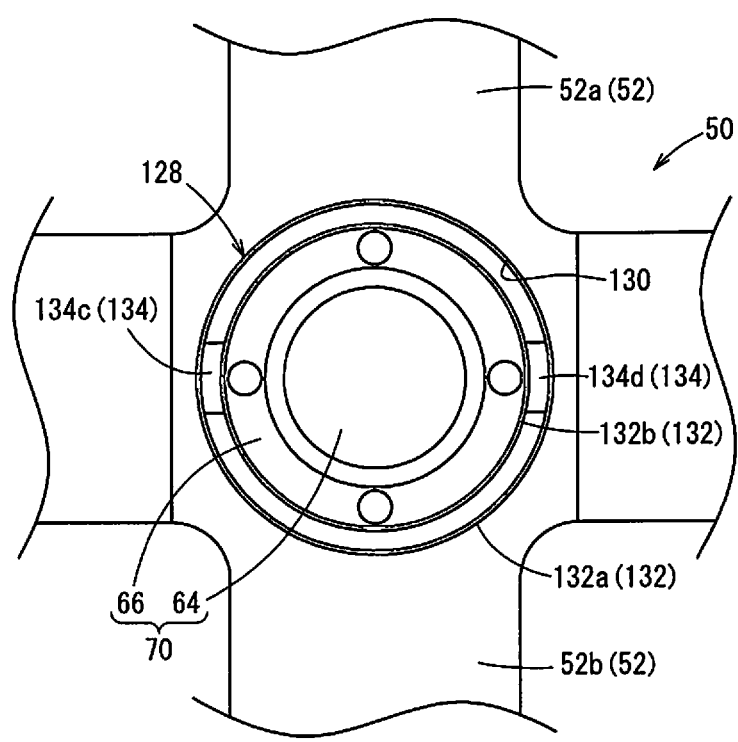
FIG. 8 is a front schematic view partially showing the crosshead as viewed from the movable platen side in the second embodiment.

FIG. 7 is a perspective view showing the rear platen 20 and the crosshead 50 in a second embodiment. FIG. 8 is a front schematic view partially showing the crosshead 50 as viewed from the movable platen 24 side.

As shown in FIGS. 7 and 8, when viewed in the back-and-forth direction of the crosshead 50, a left load cell 134c and a right load cell 134d are provided on both sides in the horizontal direction with the reciprocating mechanism 70 interposed therebetween.

The left load cell 134c and the right load cell 134d respectively detect loads in the direction to bend the left load cell 134c and the right load cell 134d when the outer peripheral cylinder portion 132a is moved relative to the inner peripheral cylinder portion 132b in the vertical direction. The load exerted on the reciprocating mechanism 70 from the crosshead 50 in the direction perpendicular to the back-and-forth direction of the crosshead 50 can be calculated from the loads in the direction to bend the left load cell 134c and the right load cell 134d.

[Operations and Effects]

In the second embodiment, the left load cell 134c and the right load cell 134d are respectively provided on the both sides in the horizontal direction with the reciprocating mechanism 70 interposed therebetween as viewed in the back-and-forth direction of the crosshead 50. With this arrangement, from the loads that are detected by the left load cell 134c and the right load cell 134d in the direction to bend the left load cell 134c and the right load cell 134d, it is possible to accurately calculate the load exerted on the reciprocating mechanism 70 in the direction perpendicular to the back-and-forth direction of the crosshead 50.

Third Embodiment

Figure 9:
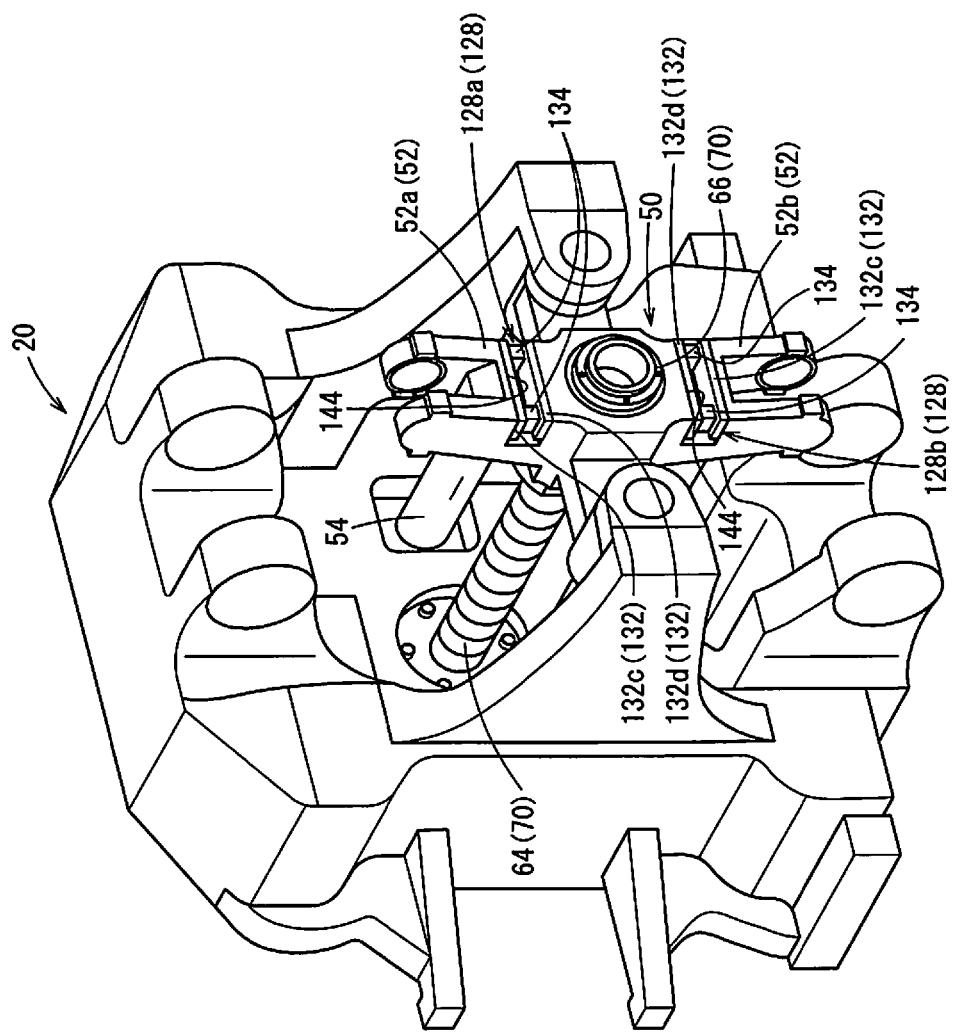
FIG. 9 is a perspective view showing the rear platen and the crosshead in a third embodiment of the present invention.
Figure 10:
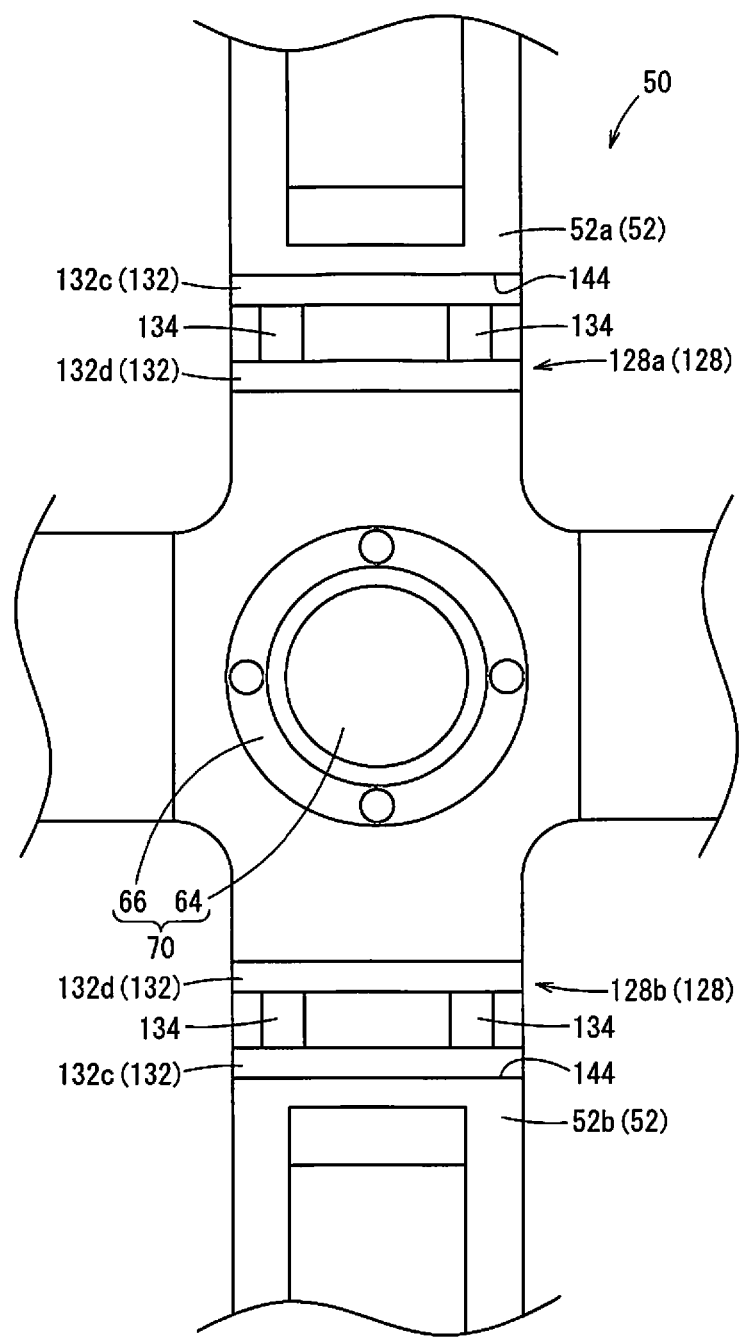
FIG. 10 is a front schematic view partially showing the crosshead as viewed from the movable platen side in the third embodiment.

FIG. 9 is a perspective view showing the rear platen 20 and the crosshead 50 in a third embodiment. FIG. 10 is a front schematic view partially showing the crosshead 50 as viewed from the movable platen 24 side.

The upper arm 52a and the lower arm 52b (arms 52) of the crosshead 50 are respectively provided with load acquisition units 128 (an upper load acquisition unit 128a and a lower load acquisition unit 128b). The upper arm 52a and the lower arm 52b are bifurcated at each end thereof and are formed at their root portions with fitting holes 144. Each of the fitting holes 144 horizontally extends in the form of a groove. The load acquisition units 128 are respectively fitted in the fitting holes 144.

As best shown in FIG. 10, each of the load acquisition units 128 has the case 132 and the load cells 134. The case 132 has a first plate member 132c and a second plate member 132d. The load cells 134 connect the first plate member 132c to the second plate member 132d. Thus, it is possible to form each load acquisition unit 128 integrally.

The load cells 134 of the upper load acquisition unit 128a detect a load that compresses or stretches the upper arm 52a in the vertical direction, while the load cells 134 of the lower load acquisition unit 128b detect a load that compresses or stretches the lower arm 52b in the vertical direction. Further, the load acquisition units 128 (the upper load acquisition unit 128a and the lower load acquisition unit 128b) each have two load cells 134 arranged to be separated in the horizontal direction when the load acquisition units 128 are viewed in the back-and-forth direction of the crosshead 50. With this arrangement, it is possible to calculate the load which is obliquely applied to the arm 52, from the difference between the loads detected by the two load cells 134. Therefore, the load exerted on the reciprocating mechanism 70 from the crosshead 50 in the direction perpendicular to the back-and-forth direction of the crosshead 50 can be calculated from the difference between the loads respectively detected by the load cells 134 of the upper and lower load acquisition units 128a and 128b.

[Operations and Effects]

In the third embodiment, the load acquisition units 128 are provided on the arms 52. With this arrangement, it is possible to detect the loads that compress or stretch the arms 52 in the vertical direction, and hence, it is possible to accurately calculate the load exerted on the reciprocating mechanism 70 from the crosshead 50 in the direction perpendicular to the back-and-forth direction of the crosshead 50.

Further, in this third embodiment, the upper arm 52a and the lower arm 52b are respectively provided with the upper load acquisition unit 128a and the lower load acquisition unit 128b. With this arrangement, from the difference between the respective loads detected by the load cells 134 of the upper and lower load acquisition units 128a, 128b, it is possible to accurately calculate the load exerted on the reciprocating mechanism 70 in the direction perpendicular to the back-and-forth direction of the crosshead 50.

Further, in this third embodiment, the load acquisition units 128 each have the first plat member 132c and the second plate member 132d, wherein the load cells 134 connect the first plate member 132c to the second plate member 132d. With this arrangement, it is possible to constitute each load acquisition unit 128 integrally.

Furthermore, in the third embodiment, each load acquisition unit 128 has the two load cells 134 arranged to be separated in the horizontal direction when each load acquisition unit 128 is viewed in the back-and-forth direction of the crosshead 50. With this arrangement, it is also possible to detect the load that is applied obliquely relative to the vertical direction of the arms 52 when the crosshead 50 is viewed in the back-and-forth direction of the crosshead 50. Consequently, it is possible to accurately calculate the load exerted on the reciprocating mechanism 70 in the direction perpendicular to the back-and-forth direction of the crosshead 50.

Fourth Embodiment

Figure 11:
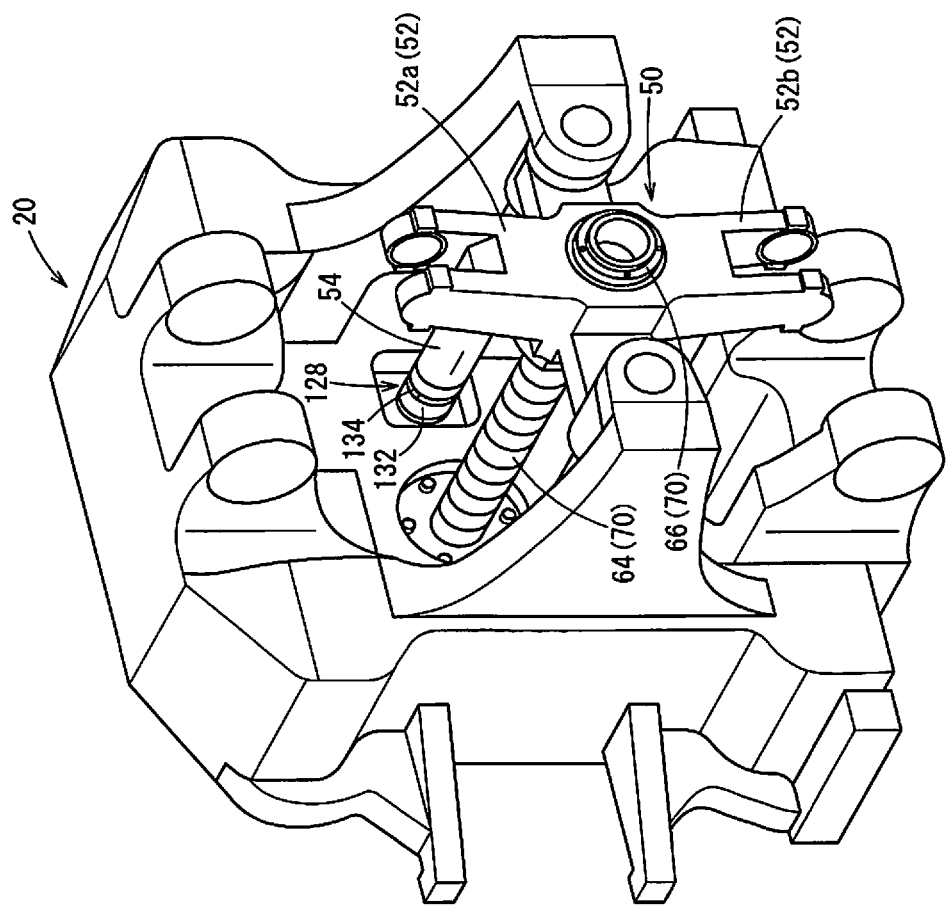
FIG. 11 is a perspective view showing the rear platen and the crosshead in a fourth embodiment of the present invention.
Figure 12:
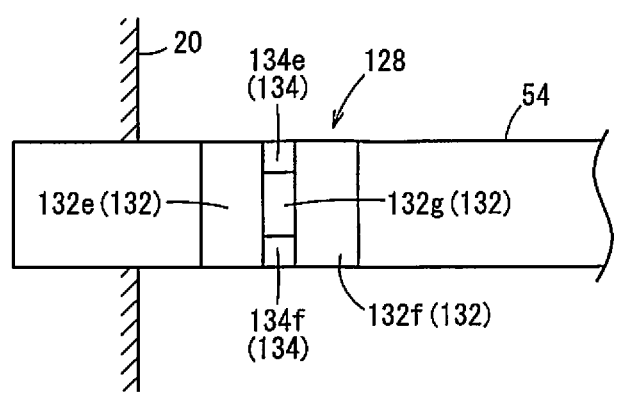
FIG. 12 is a schematic side view partially showing a guide rod in the fourth embodiment.

FIG. 11 is a perspective view showing the rear platen 20 and the crosshead 50 in a fourth embodiment. FIG. 12 is a schematic side view partially showing the guide rod 54.

The guide rod 54 is provided with the load acquisition unit 128. The load acquisition unit 128 is provided so that two separated guide rods 54 are connected by the load acquisition unit 128. The load acquisition unit 128 is provided at one end of the guide rod 54 on the side opposite to the position of the crosshead 50 (shown in FIG. 11) in a state where the mold 30 is closed.

The load acquisition unit 128 has the case 132 and the load cells 134. As best shown in FIG. 12, the case 132 is formed in a substantially cylindrical shape and has a first large diameter portion 132e and a second large diameter portion 132f which are formed at both ends in the axial direction. The case 132 also has a small diameter portion 132g which is smaller in outside diameter than the first and second large diameter portions 132e, 132f and which is formed between the first and second large diameter portions 132e, 132f. The load cells 134 are provided to connect the first and second large diameter portions 132e, 132f. With this arrangement, it is possible to constitute the load acquisition unit 128 integrally.

The load cells 134 (an upper load cell 134e and a lower load cell 134f) are respectively provided on the upper and lower sides with the small diameter portion 132g interposed therebetween. The upper load cell 134e detects a load that compresses or stretches an upper surface portion of the guide rod 54, whereas the lower load cell 134f detects a load that compresses or stretches a lower surface portion of the guide rod 54. Thus, from the respective loads detected by the first and lower load cells 134e, 134f, it is possible to calculate a stress applied to the guide rod 54 in the vertical direction.

The guide rod 54 and the ball screw 64 are provided to be parallel and are guide members for the crosshead 50 in the back-and-forth direction. Therefore, a high correlation is given between the load exerted on the guide rod 54 from the crosshead 50 in the direction perpendicular to the back-and-forth direction of the crosshead 50 and the load exerted on the reciprocating mechanism 70 from the crosshead 50 in the direction perpendicular to the back-and-forth direction of the crosshead 50. Accordingly, from the stress in the vertical direction that is applied to the guide rod 54, it is possible to calculate the load exerted on the reciprocating mechanism 70 from the crosshead 50 in the direction perpendicular to the back-and-forth direction of the crosshead 50.

[Operations and Effects]

In the present fourth embodiment, the load acquisition unit 128 is provided on the guide rod 54. With this arrangement, it is possible to calculate the load which has a high correlation with the load exerted on the reciprocating mechanism 70 from the crosshead 50 in the direction perpendicular to the back-and-forth direction of the crosshead 50. The load is exerted on the guide rod 54 from the crosshead 50 in the direction perpendicular to the back-and-forth direction of the crosshead 50. Consequently, it is possible to accurately calculate the load exerted on the reciprocating mechanism 70 from the crosshead 50 in the direction perpendicular to the back-and-forth direction of the crosshead 50.

Although certain preferred embodiments of the present invention have been shown and described in detail, it should be understood that various changes and modifications may be made therein without departing from the scope of the appended claims.

Technical Ideas or Concepts Obtained from the Embodiments

Technical concepts that can be grasped from the foregoing embodiments will be described hereinafter.

In an injection molding machine (10) which includes a stationary platen (18) to which a stationary mold (32) is attached and a movable platen (24) to which a movable mold (34) is attached, the injection molding machine opens and closes the movable mold (34) relative to the stationary mold (32) by moving a crosshead (50) backward and forward to move the movable platen (24) backward and forward relative to the stationary platen (18) through a toggle link (36). The injection molding machine further comprises a reciprocating mechanism (70) configured to receive a counterforce exerted on the crosshead (50) in the back-and-forth direction when the movable mold (34) and the stationary mold (32) are closed, and a load acquisition unit (128) configured to acquire a load exerted on the reciprocating mechanism (70) in a direction perpendicular to the back-and-forth direction of the crosshead (50). With this arrangement, it is possible to accurately calculate the load exerted on the reciprocating mechanism (70) in the direction perpendicular to the back-and-forth direction of the crosshead (50).

In the aforementioned injection molding machine (10), the load acquisition unit (128) may be provided between the reciprocating mechanism (70) and the crosshead (50). With this arrangement, it is possible for the load acquisition unit (128) to directly acquire a force transmitted from the crosshead (50) to the reciprocating mechanism (70). As a result, it becomes possible to accurately calculate the load exerted on the reciprocating mechanism (70) in the direction perpendicular to the back-and-forth direction of the crosshead (50).

In the aforementioned injection molding machine (10), the load acquisition unit (128) may have load cells (134) which are respectively provided on upper and lower sides of the reciprocating mechanism (70). With this arrangement, from a difference between respective loads detected by the load cells (134) provided on the upper and lower sides, it is possible to accurately calculate the load exerted on the reciprocating mechanism (70) in the direction perpendicular to the back-and-forth direction of the crosshead (50).

In the aforementioned injection molding machine (10), the load acquisition unit (128) may have load cells (134) which are respectively provided on both sides in the horizontal direction of the reciprocating mechanism (70) when the load acquisition unit (128) is viewed in the back-and-forth direction of the crosshead (50). With this arrangement, it is possible to accurately calculate the load exerted on the reciprocating mechanism (70) in the direction perpendicular to the back-and-forth direction of the crosshead (50).

In the aforementioned injection molding machine (10), the load acquisition unit (128) may have an inner peripheral cylinder portion (132b) fixed to the reciprocating mechanism (70) and an outer peripheral cylinder portion (132a) fixed to the crosshead (50), and the load cells (134) connect the inner peripheral cylinder portion (132b) to the outer peripheral cylinder portion (132a). With this arrangement, it is possible to constitute the load acquisition unit (128) integrally.

In the aforementioned injection molding machine (10), the load acquisition unit (128) may be provided on an arm (52) of the crosshead (50), the arm being formed between the reciprocating mechanism (70) and the toggle link (36). With this arrangement, it is possible to accurately calculate the load exerted on the reciprocating mechanism (70) from the crosshead (50) in the direction perpendicular to the back-and-forth direction of the crosshead (50).

In the aforementioned injection molding machine (10), the load acquisition unit (128) may be provided on the arm (52) of the crosshead (50) extending upward and is also provided on the arm (52) of the crosshead (50) extending downward. With this arrangement, it is possible to accurately calculate the load exerted on the reciprocating mechanism (70) from the crosshead (50) in the direction perpendicular to the back-and-forth direction of the crosshead (50).

In the aforementioned injection molding machine (10), the load acquisition unit (128) may have two load cells (134) arranged separately in the horizontal direction when the load acquisition unit (128) is viewed in the back-and-forth direction of the crosshead (50). With this arrangement, it is possible to accurately calculate the load exerted on the reciprocating mechanism (70) from the crosshead (50) in the direction perpendicular to the back-and-forth direction of the crosshead (50).

In the aforementioned injection molding machine (10), the load acquisition unit (128) may have a first plate member (132c) and a second plate member (132d), and the load cells (134) may connect the first plate member (132c) to the second plate member (132d). With this arrangement, it is possible to constitute the load acquisition unit (128) integrally.

In the aforementioned injection molding machine (10), the load acquisition unit (128) may be provided on a guide rod (54) guiding the crosshead (50) in the back-and-forth direction. With this arrangement, it is possible to constitute the load acquisition unit (128) integrally.

In the aforementioned injection molding machine (10), a usable period estimation unit (138) may be further provided that estimates a remaining usable period of the reciprocating mechanism (70) based on the load acquired by the load acquisition unit (128) and exerted in the direction perpendicular to the back-and-forth direction of the crosshead (50). With this arrangement, it is possible to improve the accuracy in estimating the usable period of the reciprocating mechanism (70).

What is claimed is:

1. An injection molding machine comprising:
   a stationary platen to which a stationary mold is attached; and
   a movable platen to which a movable mold is attached;
   the injection molding machine opening and closing the movable mold relative to the stationary mold by moving a crosshead backward and forward to moving the movable platen backward and forward relative to the stationary platen through a toggle link;
   the injection molding machine further comprising:
   a reciprocating mechanism configured to receive a counterforce exerted on the crosshead in a back-and-forth direction when the movable mold and the stationary mold are closed; and
   a load acquisition unit configured to acquire a load exerted on the reciprocating mechanism in a direction perpendicular to the back-and-forth direction of the crosshead, wherein:
   the load acquisition unit is provided in a hole defined around an outer periphery of a nut of the reciprocating mechanism.

2. The injection molding machine according to claim 1, wherein:
   the load acquisition unit has load cells which are respectively provided on upper and lower sides of the reciprocating mechanism.

3. The injection molding machine according to claim 1, wherein:
   the load acquisition unit has load cells which are respectively provided on both sides in a horizontal direction of the reciprocating mechanism when the load acquisition unit is viewed in the back-and-forth direction of the crosshead.

4. The injection molding machine according to claim 2, wherein:
   the load acquisition unit has an inner peripheral cylinder portion fixed to the reciprocating mechanism and an outer peripheral cylinder portion fixed to the crosshead; and
   the load cells connect the inner peripheral cylinder portion to the outer peripheral cylinder portion.

5. The injection molding machine according to claim 3, wherein:
   the load acquisition unit has an inner peripheral cylinder portion fixed to the reciprocating mechanism and an outer peripheral cylinder portion fixed to the crosshead; and
   the load cells connect the inner peripheral cylinder portion to the outer peripheral cylinder portion.

6. An injection molding machine comprising:
   a stationary platen to which a stationary mold is attached; and
   a movable platen to which a movable mold is attached;
   the injection molding machine opening and closing the movable mold relative to the stationary mold by moving a crosshead backward and forward to moving the movable platen backward and forward relative to the stationary platen through a toggle link;
the injection molding machine further comprising:
a reciprocating mechanism configured to receive a counterforce exerted on the crosshead in a back-and-forth direction when the movable mold and the stationary mold are closed; and
a load acquisition unit configured to acquire a load exerted on the reciprocating mechanism in a direction perpendicular to the back-and-forth direction of the crosshead,
wherein:
the load acquisition unit is provided on an arm of the crosshead, the arm being formed between the reciprocating mechanism and the toggle link,
the load acquisition unit is provided on the arm of the crosshead extending upward and is also provided on the arm of the crosshead extending downward,
the load acquisition unit has two load cells arranged separately in a horizontal direction when the load acquisition unit is viewed in the back-and-forth direction of the crosshead.

7. The injection molding machine according to claim 6, wherein:
the load acquisition unit has a first plate member and a second plate member; and
the load cells connect the first plate member to the second plate member.

8. An injection molding machine comprising:
a stationary platen to which a stationary mold is attached; and
a movable platen to which a movable mold is attached;
the injection molding machine opening and closing the movable mold relative to the stationary mold by moving a crosshead backward and forward to moving the movable platen backward and forward relative to the stationary platen through a toggle link;
the injection molding machine further comprising:
a reciprocating mechanism configured to receive a counterforce exerted on the crosshead in a back-and-forth direction when the movable mold and the stationary mold are closed;
a load acquisition unit configured to acquire a load exerted on the reciprocating mechanism in a direction perpendicular to the back-and-forth direction of the crosshead; and
two separated guide rods configured to guide the crosshead in the back-and-forth direction,
wherein the load acquisition unit is provided such that the two separated guide rods are connected by the load acquisition unit.

9. The injection molding machine according to claim 1, further comprising:
a usable period estimation unit that estimates a remaining usable period of the reciprocating mechanism based on the load acquired by the load acquisition unit and exerted in the direction perpendicular to the back-and-forth direction of the crosshead.

10. The injection molding machine according to claim 6, further comprising:
a usable period estimation unit that estimates a remaining usable period of the reciprocating mechanism based on the load acquired by the load acquisition unit and exerted in the direction perpendicular to the back-and-forth direction of the crosshead.

11. The injection molding machine according to claim 8, further comprising:
a usable period estimation unit that estimates a remaining usable period of the reciprocating mechanism based on the load acquired by the load acquisition unit and exerted in the direction perpendicular to the back-and-forth direction of the crosshead.

* * * * *